(12) United States Patent
Cocchi et al.

(10) Patent No.: US 6,442,751 B1
(45) Date of Patent: Aug. 27, 2002

(54) DETERMINATION OF LOCAL VARIABLE TYPE AND PRECISION IN THE PRESENCE OF SUBROUTINES

(75) Inventors: Anthony Cocchi, Riverside, CT (US); Janice Cynthia Shepherd, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,388

(22) Filed: Dec. 14, 1998

(51) Int. Cl.⁷ ................................................. G06F 9/45
(52) U.S. Cl. ....................... 717/133; 717/132; 717/154; 717/155; 717/156; 717/157; 707/205; 707/206
(58) Field of Search ................................ 707/206, 20.5, 707/205; 717/132, 133, 155, 156, 157, 154

(56) References Cited

U.S. PATENT DOCUMENTS

| | | | |
|---|---|---|---|
| 5,652,883 A | | 7/1997 | Adcock |
| 6,047,125 A | * | 4/2000 | Agesen et al. ............. 707/201 |
| 6,260,190 B1 | * | 7/2001 | Ju ............................ 712/205 |
| 6,327,701 B2 | * | 12/2001 | Ungar ....................... 707/101 |

OTHER PUBLICATIONS

Goldberg, "Tag–free garbage collection for strongly typed programming languages", ACM, pp. 165–176, Jun. 1991.*
Tolmach, "Tag–free garbage collection using explicit type parameters", ACM, pp. 1–11, Jun. 1994.*
Ali–Reza Adl–Tabatabai et al., "Fast, Effective Code Generation in a Just–In–Time Java Compiler", SIGPLAN '98, Montreal, Canada, pp. 280–290, Apr. 1998.
Ole Agesen et al., "Garbage Collection and Local Variable Type–Precision and Liveness in Java® Virtual Machines", SIGPLAN '98, Montreal, Canada, pp. 269–279, Apr. 1998.

* cited by examiner

Primary Examiner—Gregory Morse
Assistant Examiner—Ted T. Vo
(74) Attorney, Agent, or Firm—F. Chau & Associates, LLP

(57) ABSTRACT

A method is provided for tracking the type of at least one local variable after calling a subroutine. The exemplary method associates each one of a plurality of branch instructions calling the subroutine with a first information, which indicates the type of value stored in the local variable when each one of the plurality of branch instructions is executed. The exemplary method associates at least one execution point-of-interest within the subroutine with a second information. The execution point-of-interest is any point within the subroutine where it may be necessary to ascertain the type of each local variable. The second information is a data structure indicating a change in type made to the local variable after entering the subroutine and before the execution point-of-interest. The exemplary method associates the execution point-of-interest with a return address for the subroutine. This return address enables the method to identify the point in the calling program from which the current subroutine was called. When a request is received to identify the type of the local variable at the execution point-of-interest in the subroutine, the exemplary method obtains a second map from the second information using the execution point-of-interest. The second map indicates the change in type of the local variable made within the subroutine. The method also obtains the return address associated with the execution point-of-interest, and obtains a first map from the first information using the return address. The first map indicates the type of value stored in the local variable when one of the branch instructions is executed to call the subroutine. Given the first and second maps, the exemplary method merges the first map with the second map to identify a current type for the local variable. In performing this merge, the method combines the type status of the local variable as modified by the subroutine with the type status of the local variable as it stood before calling the subroutine.

32 Claims, 6 Drawing Sheets

| 1 | 1 | 0 | 0 | 0 | 0 | 0 | 1 | 0 | 0 |

FIG. 6A

| 1 | 0 | 0 | 0 | 1 | 0 | 0 | 0 | 0 | 0 |

Set to Reference (STR)

| 0 | 1 | 0 | 1 | 0 | 1 | 0 | 0 | 0 | 0 |

Set to Non-Reference (STNR)

FIG. 6B

| 1 | 0 | 0 | 0 | 1 | 0 | 0 | 1 | 0 | 0 |

FIG. 6C

DETERMINATION OF LOCAL VARIABLE TYPE AND PRECISION IN THE PRESENCE OF SUBROUTINES

FIELD OF THE INVENTION

The present invention relates, in general, to the tracking of variables, and more particularly, to the tracking of local variables when subroutines are called. In particular, a method and apparatus are disclosed for tracking local variable types following subroutine invocation.

BACKGROUND OF THE INVENTION

In most language implementations, a stack is used for tracking method calls and returns, and for holding the values of local variables and intermediate results. For languages that support multiple threads, a stack is created for each thread that is created. The stacks are divided into frames, with each frame pushed onto the stack when a method is invoked and popped from the stack when a method returns. Each frame, except the current frame, contains the location of the next instruction to be executed when normal control returns to that frame. For the current frame (the frame for the method that is currently being executed) the location of the current instruction being executed is kept in the frame or in a machine-dependent location (e.g. a machine-register). Each frame thus pinpoints the instruction currently being executed by the method represented by the frame (hereafter referred to as the execution point). Local variables of a method are assigned to different slots within the frame that was created when that method is executed. A more detailed description of stack frames as used in a Java™ Virtual Machine is described in "The Java™ Virtual Machine Specification", Lindholm, Yellin, Section 3.6, 1996, herein incorporated by reference in its entirety.

The Java™ Virtual Machine (JVM) is different from other execution models in that during distinct execution portions of a method, a local variable may store values of different types. For example, during one part of the execution of a method, a local variable may hold a value of type integer (int). However, in another part of the execution of that same method, the same local variable may hold a reference (pointer) to a heap-allocated object.

During the execution of a program, it may be advantageous to track and determine precisely the types of the values stored in each of the local variables. Two exemplary applications for such type tracking are dynamic storage reclamation (garbage collection), and debugging. For dynamic storage reclamation, it is desirable to precisely determine which local variables contain references to heap-allocated objects.

For debugging, it is desirable to precisely identify the types of values stored in local variables when displaying the values stored in the local variables to the user. Given the type of data stored in a given local variable, the debugger then can display that data correctly to the user. Specifically, given a value stored in a local variable and not knowing the type of value stored in the variable, the debugger will not know whether that value is a pointer to the value or is the actual value itself. Further, even if the value is known to be a non-pointer, or primitive, value the debugger must know the specific data type to display the value properly to the user. For example, integer data, floating-point data, and character data are stored using different internal representations. Given only the value represented in internal format, the debugger must know the type of the value to translate and display that value to the user correctly. Displaying the values and types stored in local variables enables the user to define his or her debugging strategy accordingly. In the context of this application, the term "primitive" refers to any non-pointer data type, including but not limited to character, integer, long, short, float, and bit or flag.

The Java™ Virtual Machine Specification, incorporated by reference above, specifies rules to which the bytecode of a Java™ class file must conform to be considered valid. A verifier can be used before execution to ensure that a Java™ class file conforms to these rules. One Java™ rule specifies that at any given point within a method, regardless of the code path leading to that point, a local variable can only be accessed if it is known to contain a value of the type expected by the entity accessing the local variable. For example, if at a point in a method, a local variable is to be accessed as a reference, then all code paths to that point must assign a reference or a null to that variable. Likewise, if a local variable is being accessed as a float, then all code paths leading to that access must assign a float type to that local variable. This rule means that for many Java™ class files, a simple static analysis of the bytecode for each Java™ method will identify the type status for all local variables at all locations of interest within the method. The analysis is said to be "static" because it does not consider the specific control flow path taken through the method during execution.

A static analysis of the bytecode may not work if the bytecode contains JSR (jump subroutine) instructions. The JSR instructions supported by Java™ are unlike subroutine calling instructions supported by other languages in that the JSR instruction places no new frame on the stack. Thus, the JSR instruction makes no new "copies" of local variables. Instead, the subroutine targeted (hereinafter the "target subroutine" or the "JSR-subroutine") by the JSR instruction accesses the same local variables at the same memory locations as does the calling program. Further, the JSR-subroutine can store new values in the local variable, or can alter the type of value stored in the local variable. Accordingly, depending on which particular JSR instruction called the JSR-subroutine, a given local variable could store data having different types. Other languages and the Java™ method call create a new set of local variables on a new stack frame. Thus, in such other languages type determination is a simple matter of analyzing the copy of the local variables as they exist on the stack.

In a JSR-subroutine, the determination of the type may depend on the flow of execution through the method. A JSR instruction is used to jump to a subroutine (a section of code within the method). The execution of a JSR instruction places the address of the instruction that appears immediately after the JSR instruction on the top of the stack. This is the return location for the JSR-subroutine. During the execution of the JSR-subroutine, the return location is saved in a local variable. The execution of the subroutine completes with the execution of a "ret" instruction that specifies the local variable containing the return location. Also, a JSR-subroutine can also terminate abruptly as described below.

Several different points in the bytecode can have JSR instructions that specify the same target JSR-subroutine. After execution of the subroutine, the execution continues with the instruction that follows the JSR instruction that jumped to the subroutine, as stored in the local variable. Local variables of the method are definable and accessible within the JSR-subroutine, subject to the same rules on uses of local variables as is the rest of the method.

The JVM rules allow a local variable to hold values of different types when different JSR instructions are executed that lead to the same JSR-subroutine. According to this rule, the local variable may not be accessed within the JSR-subroutine, but its existence adds to the complexity of determining precisely the types of values held in local variables for execution points within the JSR-subroutine. A simple static analysis does not consider or determine which JSR instruction was executed to jump to the JSR-subroutine, and accordingly does not track the type of value currently stored in local variables before jumping to the JSR-subroutine.

Note that a JSR-subroutine may also terminate abruptly if an exception occurs during it execution, in which case execution control is transferred to an appropriate exception handler, such as a Java™ "catch" block. This abrupt termination is mentioned only for completeness. The invention pertains to the determination of the types of values held in local variables during the execution of a JSR-subroutine. Whether the subroutine completes normally or abruptly is not relevant to the invention.

A JSR-subroutine can in turn include a JSR instruction jumping to another JSR-subroutine. Such nesting of JSR instructions within JSR-subroutines means that for a given execution point within a JSR-subroutine, the types of values held by the local variables may depend on which set of JSR instructions have been executed to reach that point. Recursion, either direct or indirect, is not permitted.

One approach to determining the types of the locals variables at various execution points within JSR-subroutines is to rewrite the bytecode prior to execution to prevent a given local variable from storing values of different types when different JSR instructions branching to the same JSR-subroutine are executed. Rewriting the bytecode might involve duplicating the JSR-subroutines so that there is one version of the JSR-subroutine for each type of value stored in a given local variable at the time of the different JSR instructions. One drawback to this approach is that it increases the size of the bytecode. Further, if JSR-instructions are nested, the number of copies of the individual JSR-subroutines may grow exponentially, further swelling the bytecode.

Another approach to rewriting the bytecode involves splitting a local variable into multiple local variables if it is determined to be holding different types at the time of different JSR instructions calling the same JSR-subroutine. During garbage collection, local variables that hold values of any non-reference type can be grouped as one type, allowing the local variable to be split just two ways. This grouping for garbage collection reduces the splitting of local variables, but does not eliminate it. However, during debugging, the reference/non-reference dichotomy is not available, and the local variable must be split once for each different type of value it may hold before a given point-of-interest. Agesen, et al., proposed this splitting approach in 1998.

The variable-splitting approach involves the introduction of new local variables to the bytecode. In Java™ bytecode, local variables are referenced by numbers. Local variable 1 is a separate local variable from local variable 5. Bytecode is tuned for space-efficiency such that references to local variables with very small numbers take less space than references to local variables represented by larger numbers. The variable-splitting approach means that bytecodes that had referred to local variable X may now need to refer to local variable Y. Accordingly, variable-splitting may increase the size of the resulting bytecode.

Thus, both rewriting approaches can increase the size of the resulting bytecode. Because the JVM imposes an upper limit on the size of the bytecode for a method, both rewriting approaches may fail for some large methods. Also, because the JVM imposes an upper limit on the number of unique local variables defined by a method, the variable-splitting approach suffers a further disadvantage.

SUMMARY OF THE INVENTION

In a computer program having a subroutine which is executed following a subroutine invocation, types of local variables are tracked. A base map indicating types of the local variables is generated for the subroutine invocation outside of the subroutine. For a point-of-interest within the subroutine, a delta map indicating changes to any of the local variables is generated. An execution path towards the point-of-interest is determined to identify the base map as corresponding to the subroutine invocation. The base map is merged with the current delta map which is obtained from the delta map in accordance with the execution path to determine types of the local variables.

BRIEF DESCRIPTION OF THE DRAWINGS

FIGS. 6(*a*)–6(*c*) are exemplary maps which are useful for illustrating the merging operation.

OVERVIEW OF THE INVENTION

Figure 1:
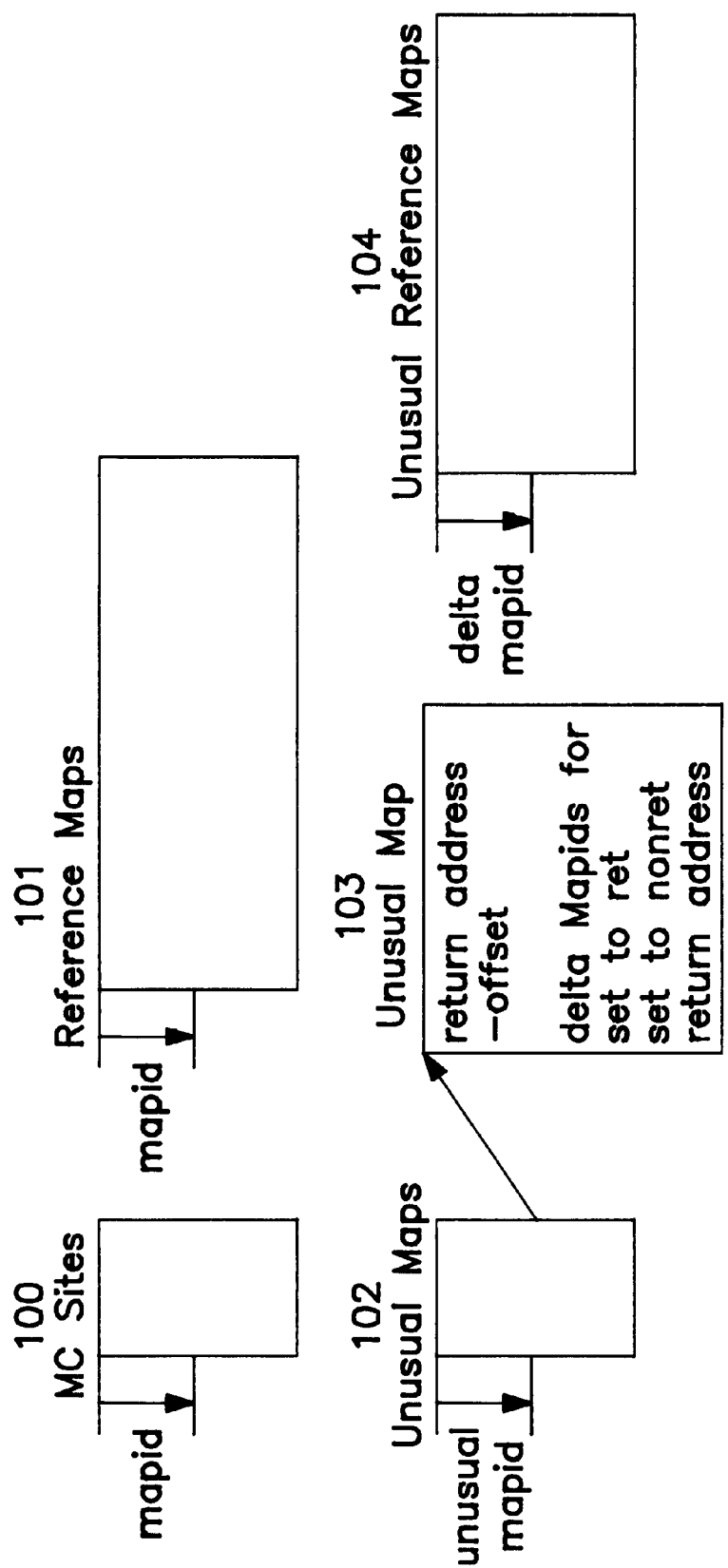
FIG. 1 is a block diagram of exemplary data structures for referencing maps.

The invention provides a method for tracking the type of at least one local variable after calling a subroutine. The invention finds particular utility in the context of programming languages that allow local variables to store different types of values at different points in program execution, and that do not create a new stack frame when invoking a subroutine. Accordingly, the called subroutine has access to, and can change the types of, the same copy of the local variables as does the caller subroutine. These two properties complicate the issue of tracking local variable types. Java™ is an exemplary language having these two properties, but the invention applies equally to other languages having these two properties.

In an exemplary embodiment, the invention provides a method of tracking a type of at least one local variable at a given point within a subroutine, with an exemplary method comprising the following steps. The method first generates information representing an address of a branch instruction calling the subroutine, representing a type of the local variable at the branch instruction, and representing any changes to the type of the local variable made within the subroutine after the branch instruction and up to the given point. The method then identifies the type of the local variable at the given point within the subroutine based on the information generated in the first step of the method.

Proceeding in further detail, the exemplary method associates each one of a plurality of branch instructions calling the subroutine with a first information. The first information is a data structure indicating the type of value stored in the local variable when each one of the plurality of branch instructions is executed. For convenience, the first information is a local variable map defining the types of each local variable when the subroutine is called.

The exemplary method associates at least one execution point-of-interest within the subroutine with a second information. The execution point-of-interest is any point within the subroutine where it may be necessary to ascertain the type of each local variable. The second information is a data structure indicating any changes (if any) in type made to the local variable after entering the subroutine and before the execution point-of-interest. For convenience, the second information is a delta map indicating any changes made to the local variables after branching to the subroutine and before the execution point-of-interest.

The exemplary method associates the execution point-of-interest with a return address for the subroutine. This return address enables the method to identify the point in the calling program from which the current subroutine was called. Using this return address, the method steps backwards through the chain of subroutine calls, identify each calling point and tracking changes made to local variables up to each calling point.

When a request is received to identify the type of the local variable at the execution point-of-interest in the subroutine, the exemplary method obtains a second map from the second information using the execution point-of-interest. The second map indicates the change in type of the local variable made within the subroutine. The exemplary method also obtains the return address associated with the execution point-of-interest, and obtains a first map from the first information using the return address. The first map indicates the type of value stored in the local variable when one of the branch instructions is executed to call the subroutine.

In the case where subroutine calls are "nested" (one subroutine calls another subroutine), the second maps corresponding to the "called" subroutine is merged or combined with the second map. This merging or combining step is repeated for each level of nesting in the subroutine call chain, i.e. for each subroutine that calls another subroutine. This step is repeated until a calling point is reached that is not within a subroutine.

Given the first and combined second maps, the exemplary method merges the first map with the second map to identify a current type for the local variable. In performing this merge, the exemplary method combines the type status of the local variable as modified by the subroutines with the type status of the local variable as it stood before calling the subroutines.

The advantage of the exemplary methods over the alternate solutions described in the Background involving rewriting the bytecode is that the exemplary methods can be used for all valid bytecodes. Unlike the rewriting approaches, which can fail if the rewriting creates too many new locals or too many new bytecode instructions, the exemplary methods do not violate any of the fixed limits defined for a JVM. Building the extra delta maps requires little extra time or space over the building of the local variable maps for execution points not within JSR-subroutines. Accordingly, the exemplary method allows precise tracking of local variable types without breaking any JVM rules, and without expanding the size of the bytecode or the number of local variables.

DETAILED DESCRIPTION OF EXEMPLARY EMBODIMENTS

An exemplary method of the invention provides a process by which the types of local variables may be determined during stack analysis. The method uses a "JSR-subroutine" call chain, a local variable base map defined at the time of an initial JSR instruction and a further local variable map, hereafter referred to as a "delta map," that reflects changes made to local variables after jumping to the JSR-subroutine.

The "JSR-subroutine" call chain is the sequence of JSR-subroutine calls executed within a method to reach the current execution point in that method. Static data flow analysis of the bytecode reveals the execution points within a method that are within a JSR-subroutine. As discussed earlier, execution of a JSR instruction places a return address (the address of the instruction after the address of the JSR instruction) on an operand stack. After the jump to the JSR-subroutine and during execution of the JSR-subroutine, that return address is saved in a local variable. Using static data flow analysis, the location of the return address (its position on the operand stack or in a local variable) can be determined for each execution point in a JSR-subroutine.

The local variable base map is a structure that, for each local variable, identifies the type of value, if any, stored in the local variable. For garbage collection, the local variable map need only indicate whether the value stored is of type reference or non-reference, i.e., whether the value is a pointer into the heap or not. For other purposes, such as debugging, the local variable map should store more specific type information, including but not limited to long, float, integer, etc. Using static data flow analysis of the bytecode, the local variable maps can be defined for all execution points of interest that are outside of JSR-subroutines.

The delta map is a structure that, for each local variable, identifies the type of values, if any, last assigned to the local variable since entering the JSR-subroutine. Using simple static data flow analysis of the bytecode, the delta map can be determined for execution points within a JSR-subroutine. It should be noted that the local variable base map stores the type status of each local variable at a point before entering the JSR-subroutine, while the delta map tracks any changes made to the type status of the local variables after entering the JSR-subroutine.

The exemplary method of the invention uses two additional logical structures: a "map locator" and a "return address locator". The map locator associates any execution point-of-interest with its appropriate map (local variable base map or delta map). The return address locator is used to associate each execution point-of-interest within a JSR-subroutine with the location of its corresponding return address. An execution point-of-interest is any point within a subroutine where it may be necessary to ascertain the type of one or more local variables. An execution point-of-interest may correspond to a potential garbage collection site.

The steps of an exemplary method are:
1. For each JSR instruction not within a JSR-subroutine, define the local variable base map at the JSR instruction, using simple static data flow analysis. (see, e.g., Compilers, Principles, Techniques, and Tools—Aho, Sethi, Ulman 1986). For each JSR instruction, make an entry in the map locator linking that JSR instruction to its corresponding local variable base map.
2. For each execution point-of-interest within a JSR-subroutine, identify the changes, if any, made to the type of value stored in each of the local variables after entering the JSR-subroutine and including the given execution point-of-interest. For each execution point-of-interest, store each of these changes to the local variables in a delta map for that execution point-of-interest. For each execution point-of-interest, make an entry in the map locator linking that execution point-of-interest to its corresponding delta map.

If a delta map were created for the entry point of the JSR-subroutine (the point prior to executing the first instruction of the JSR-subroutine), that delta map would indicate that no local variables had been changed. Two different execution points within a JSR-subroutine will have different delta maps if any of the local variables are assigned a different type between the two execution points.

3. For each execution point-of-interest within a JSR-subroutine, determine the location of the return address value. When the JSR instruction is executed, the return address is put onto the operand stack, and during the JSR-subroutine, the return address is stored into a local variable. For each execution point-of-interest, make an entry in the return address locator indicating the return address corresponding to that execution point-of-interest. It should be noted that the steps 1–3 described herein can be performed during the garbage collection or as a pre-processing step before the garbage collection.

4. During the execution of the garbage collection, determine if the stack frame shows that the execution is within a JSR-subroutine. As described above, this can be done with static data flow analysis. If the execution point is within a JSR-subroutine, consider this point of execution to be the current execution point-of-interest and the JSR-subroutine to be the current JSR-subroutine, and proceed as follows:

a. Using the current execution point-of-interest as an index into the map locator structure, map the execution point-of-interest to the delta map corresponding to that execution point-of-interest. Using the located delta map, determine the current type status of each local variable at the current execution point-of-interest. This delta map will be referenced below as the "first" delta map.

b. Using the current execution point-of-interest as an index into the return address locator structure, map the current execution point-of-interest to the location and value of the return address corresponding to that current execution point-of-interest.

c. Use the value of the return address to determine the address of the "calling" JSR instruction that was executed to jump to the current JSR-subroutine. As described above, the JSR instruction is the preceding instruction from the one pointed to by the return address.

d. If the calling JSR instruction is not within a JSR-subroutine, then continue with step 5.

e. Using the address of the "calling" JSR-subroutine as an index into the map locator, map that address to its corresponding delta map. Use this delta map to identify the type status of each of the local variables at the execution point of the "calling" JSR instruction. This delta map will be referenced below as the "second" (or further) delta map.

f. Merge the first delta map with the second delta map, giving precedence to the first delta map, to produce a composite delta map. If the first delta map shows that the type of a local variable has been changed, then that change is used for that variable in the composite delta map. Otherwise, the value from the second delta map is used for that variable. Merging the delta maps in this fashion preserves the order in which the changes were made during execution by ensuring that the latest-made change is reflected in the composite delta map. The composite delta map then becomes the current delta map.

g. The "calling" JSR-subroutine that contains the current JSR instruction becomes the current JSR-subroutine and the execution point-of-interest becomes the "calling" JSR instruction.

h. Continue with step b. In effect, this loop is repeated for each "calling" JSR-instruction that is located within another JSR-subroutine. By repeating this loop in this manner, the exemplary method handles "nested" JSR-instructions.

5. Using the address of the JSR instruction as an index into the map locator structure, map that address to its corresponding local variable base map. Since this address of the JSR instruction is not within a JSR-subroutine, the map locator structure will provide a local variable base map for that address, rather than a delta map.

6. Merge the local variable base map of the JSR instruction with the current delta map (from 4(a) or 4(f) above), giving precedence to the delta map, to produce a merged map. If the current delta map shows that the type of a local variable has been changed, then that change is reflected in the merged map. Otherwise, the value from the local variable base map is reflected in the merged map. The entries in the merged map indicates the type of each of the local variables at the original execution point (step 4).

It should be noted that the steps 1 through 3 above could be performed before executing the program as a type of pre-processing. Alternatively, those steps can be performed when the program has reached an execution point where it is necessary to determine the types of the local variables. The described method for building the local variable base maps and the delta maps is independent of the actual time at which the method is executed.

EXEMPLARY IMPLEMENTATION

I. Overview

In an exemplary implementation, the defined method is described as a garbage collector for a Java™ virtual machine. However, it should be understood that the concepts and methods described herein can readily by applied to debugging, or to other applications where it is necessary to ascertain precisely the type currently assigned to each local variable at given points in the execution of subroutines, such as JSR-subroutines. Where appropriate below, the discussion will include exemplary embodiments of the present invention which relate to debugging or other applications. An exemplary embodiment of the present invention precisely identifies all of the live roots and uses them to determine the live objects. The remaining objects are dead and will be garbage collected. In the context of debugging, the type of each local variable is determined precisely as of the instant that the debugging session is initiated. In this manner, each local variable can be displayed in the correct format to the user, better facilitating debugging.

Live roots exist in either static data or the stack frames. The processing of the static data does not involve the exemplary method of the invention and will not be discussed any further. Determining the live roots in the stack frames requires a scan of all the stack frames and knowing the format of each frame. Note that each method invocation pushes one frame onto the stack. An exemplary embodiment of the present invention processes those stack frames that involve JSR-subroutine calls.

An exemplary embodiment of the present invention is based on translation, or compilation of the Java™ bytecodes to machine code. However, a further exemplary embodiment of the present invention extends to a bytecode interpretation. In an exemplary embodiment of the present invention, the virtual machine is itself written in Java™. Accordingly, everything is a Java™ object, including the machine code of a method.

Garbage collection is initiated whenever a request for memory cannot be satisfied from available storage. The garbage collector looks for all the live objects in the system, starting by determining the set of "root" pointers. The set of live roots includes all of the local variable pointers, the pointers in the operand stack for each stack frame, and the static variables that point to objects. The "live" set of objects further includes the objects pointed to by the root set, as well as the transitive closure of the objects pointed to by these objects. All other objects are "dead" and can be garbage collected. (see Garbage Collection, "Algorithms for Automatic Dynamic Memory Management", Jones, Lins, 1996, section 2.5.). The dynamically-allocated memory allocated to these dead objects is de-allocated, thereby freeing more dynamic memory for use by other applications. In the context of garbage collection, the term "object" refers to data structures for which memory is dynamically allocated from the system heap.

As the garbage collector scans the stack frames, it will occasionally encounter frames where the execution point is within a JSR-subroutine. It is at these points where the method described above is used to locate the roots within that stack frame. An exemplary garbage collection process is described below.

1. Maintain a list of all objects currently allocated in the memory system. Maintain a list of the non-allocated spaces in the memory system.
2. Can the request for memory be satisfied with non-allocated memory?
3. If no, then
   Identify the set of "live" objects currently stored in the system by:
      determining the set of "root" pointers including:
         local variable pointers/pointers in the operand stack for all the stack frames; and
         static variables that point to objects;
      identifying all objects pointed to by the set of root pointers; and
      recursively identifying the set of objects that are pointed to by these objects.
4. Identify all objects currently stored in memory system that are not part of the set of "live" objects, as identified in step 3. Any object not "live" is "dead". Given a list of all objects currently allocated, and a list of "live" objects that are currently being pointed-to, then the "dead" objects are identified by "subtracting" the latter list from the former list. Add the space allocated to these "dead" objects to the list of non-allocated memory, thereby de-allocating the "dead" objects.
5. Can the request for memory be satisfied from space in the non-allocated list? If no, then request more memory from the operating system or indicate to a user that not enough space is available for the application.

The process may perform additional memory allocation optimizations, such as object relocation to minimize fragmentation of memory. For more details, see Garbage Collection, Algorithms for Automatic Dynamic Memory Management, Jones, Lins, 1996, section 2.5. herein incorporated by reference in its entirety.

An exemplary embodiment of the invention is used in step 3 above to scan the stack frames to determine the set of local variable pointers in the stack frame.

Data Structures

Information concerning the location of roots in the stack is contained in reference maps. A set of maps is associated with each method, with one map for every site where it may be necessary to identify the type of each local variable, such as where a garbage collection, a debugging session, or similar operation may occur.

Figure 2A:
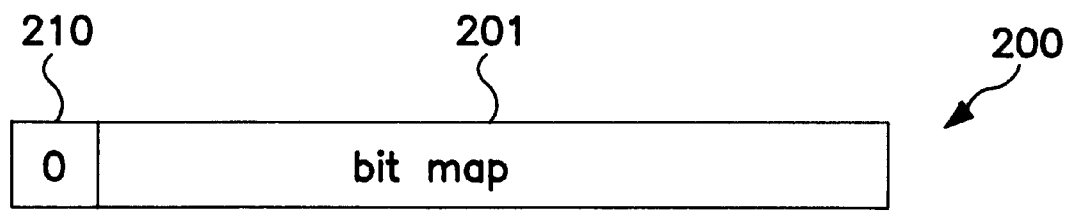
FIGS. 2(*a*) and 2(*b*) are block diagrams illustrating types of maps.
Figure 2B:
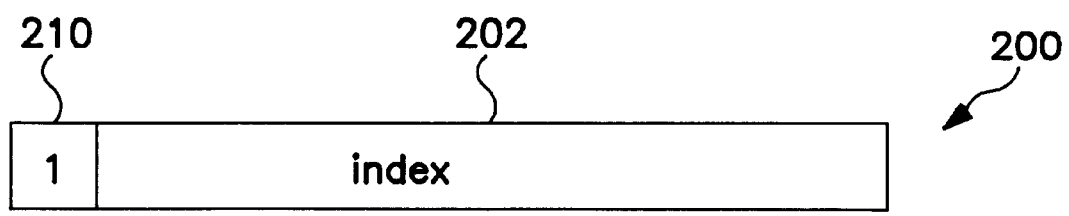

FIG. 1 is a block diagram illustrating the object structures used for referencing reference maps. FIGS. 2(a) and 2(b) illustrate various types of reference maps. The reference maps can be generated either statically before the running of the application or dynamically while collecting garbage or debugging. The maps are generated the same way regardless of when the maps are generated.

MCSites array 100 is an array of integer offsets, one for each execution point-of-interest in the bytecode where a garbage collection or a debugging session may be requested. The offset is the offset of the point-of-interest from the beginning of the method code. That is, given an offset into the bytecode, the MCSites array 100 is searched to find the entry that corresponds to the given offset. When the correct entry in the MCSites array 100 is found, the index of that correct entry becomes the mapid, which locates the point-of-interest in the reference maps object 101.

The referenceMaps object 101 is an array of reference maps that correspond on a one to one basis with the sites, i.e., for each point-of-interest there exists an entry in the referenceMaps structure. The most significant bit 210 of each map 200 identifies which of two types of entry are present. For sites of interest not within JSR-subroutines, the rest of the entry consists of bit map 201, with one bit per local variable and one bit for each possible word on the Java™ stack. For sites of interest within a JSR-subroutine, the entry contains an index 202 (the UnusualMaps id) into the UnusualMaps array 102 where information about that site is maintained.

The UnusualMaps array 102 is an array of references to UnusualMap objects containing one entry per site within a JSR-subroutine. The referenceMaps array 101 provides an index into this array when the point-of-interest is within a JSR-subroutine. Each entry in the UnusualMaps array 102 points to an UnusualMap object 103 where information about this point-of-interest is stored.

Each UnusualMap 103 object contains the map information for a site of information within a JSR-subroutine. This map information includes the offset to the frame location containing either the local variable or the operand stack entry that contains the return address from the JSR-subroutine. This map information also includes other information depending on whether the method of the invention is performing garbage collection or debugging.

For garbage collection, the Unusual Map object (103) is configured as a locator for locating the set-to-ref (or set-to-reference), set-to-non-ref (set-to-non-reference) and return address arrays. These arrays, together, comprise a delta map. These locators (or indices) locate each of three arrays stored in the unusualReferenceMaps object 104. The set-to-ref array identifies all local variables into which the subroutine stored references to objects (pointers) at any time between entering the subroutine and executing the given point-of-interest within the subroutine. Similarly, the set-to-nonref array identifies all local variables into which the subroutine stored non-reference types at any time between entering the subroutine and executing the given point-of-interest within the subroutine. If the subroutine stored sequentially both a reference and a non-reference type in the same local variable, then these two arrays only show the results of the latest store executed before the point-of-interest. If at a given point in the subroutine a variable is set to different types via different execution paths, then the variable is considered as "set to non reference". The return address array identifies the local variables and operand stack entries that contain return addresses from the JSR-subroutine (one for each subroutine when nested).

The unusualReferenceMaps object 104 contains the bit maps for the set-to-ref, set-to-nonref, and return-address arrays, with one bit for each local variable. A "1" indicates one or more actions was taken and a "0" indicates that no action was taken or that a previous action has been superceded. For example a "1" stored in the location of the set-to-ref array corresponding to a given local variable indicates that the subroutine has stored a reference in that local variable. Likewise, a "1" stored in a location in the set-to-nonref array indicates that the subroutine set the corresponding local variable to be a non-reference, or primitive type or that the variable was set to different types along alternate execution paths within the subroutine. Note that a "0" in the set-to-ref or set-to-nonref arrays of the delta map indicates that the local variable was not set up to this point in the subroutine or that the set action has been superceded.

In the context of debugging or other applications, the Unusual Map and Unusual Reference Maps objects 104 are configured to indicate the type of value stored in each local variable, rather than to indicate whether the type is a reference or a non-reference, as discussed above. Specifically, instead of providing a set-to-ref array and a set-to-nonref array, the objects 103 and 104 could provide a separate array for each type of value that could be assigned to a local variable. For example, a set-to-int array could store a bit identifying each local variable set to an integer type, a set-to-float array could store a bit identifying each local variable set to a float type, and so on for each possible type of value. Alternatively, the objects 103 and 104 could provide a single array having an entry for each local variable, with each entry configured to store a code. A unique code, such as a multi-bit code, could be associated with each type of value, so that storing one of the codes in the array indicates that the subroutine set a given local variable to the type corresponding to that code. One unique code is required for the case when alternate paths to a site assign different types to the same variable.

II. Map Generation

The generation of the maps proceeds as follows:

1. The bytecodes for each method are analyzed. For garbage collection, each instruction that stores into a local variable results in the analysis program remembering whether the store was a reference or not. For debugging, the analysis program remembers whether the type of data stored in the local variable. Note that the bytecode generation rules require the type of data stored in local variables at any bytecode is independent of the execution path except within a JSR-subroutine.

2. At any bytecode instruction where garbage collection or debugging may occur, a map is generated and saved. The maps are of two types: a local variable base map or a delta map. Maps of the delta map type are generated at potential garbage collection or debugging points within a JSR-subroutine. At all other potential garbage collection or debugging points, a map of the local variable base map type is generated.

In the context of garbage collection, the local variable base map may be a "reference" map that contains exact information as to whether each local variable contains an object reference or not. In this context, a "delta" map corresponding to a given point in the JSR-subroutine contains only information indicating the net effect of the changes made, if any, in the JSR-subroutine to the reference-status of the local variables up to that given point.

In the context of debugging, the local variable base map may store the exact type of value stored in each local variable. In this context, a "delta" map corresponding to a given point in the JSR-subroutine contains only information indicating the net effect of the changes made, if any, in the JSR-subroutine to the type-status of the local variables up to that given point.

The maps are generated either when the bytecodes are converted to machine code or during garbage collection or debugging, as the frame for each method on the stack is scanned. The method for generating these maps remains the same regardless of when the maps are generated.

3. The maps contain the following information:
   a. In the context of garbage collection, the local variable base map can be a "reference" map that contains a plurality of bits, with each bit representing either a local variable or a word on the Java™ stack. For the purpose of the method described here, the Java™ stack words and corresponding bits are irrelevant. If a bit is a one, it means that the corresponding word is a reference; a zero implies that the word is not a reference, i.e., it contains some other type such as int, float etc. or no type. In the context of debugging, the local variable base map indicates the type of value stored in each local variable, employing one of the schemes discussed above.
   b. A delta map is associated with each given point-of-interest in the JSR-subroutine, and identifies all changes made to local variables during the execution of the JSR-subroutine from entry to the given point-of-interest. In the context of garbage collection, an exemplary implementation uses a delta map which includes three arrays to designate the following:
      the locals that have been "set-to-reference",
      the locals that have been "set-to-nonreference" and
      the locals or Java™ stack words that contain subroutine return addresses.

In the set-to-reference array, if a bit is a one, it means that the corresponding word was last set to a reference during the JSR-subroutine. A zero implies that the word was not set to a reference in the current JSR-subroutine or was superceded by some set-to-nonreference action. Note that a zero means the word could contain either a reference or nonreference. For example, a previously called method or JSR-subroutine could have set the local variable to be a reference.

In the set-to-nonreference array, if a bit is a one, it means that the corresponding word was set to a nonreference during the JSR-subroutine or that alternative executions exist within the subroutine that set the corresponding word to different types. A zero implies that the word was not set to a non-reference type in the current JSR-subroutine or was superseded by a set-to-reference action. As above, note that the word could still contain a nonreference or reference.

For the return-address array, if a bit is a one, it means that the corresponding word contains a JSR return address. The reason for this array is that in an exemplary embodiment of the present invention, each method (the machine code) is an object. JSR return addresses stored in local variables are therefore internal pointers to these objects and since a copying garbage collection can move these objects, it is desirable to track their location and relocate these internal pointers to maintain continuity before and after the garbage collection.

III. Stack Walking during Garbage Collection

Figure 3:
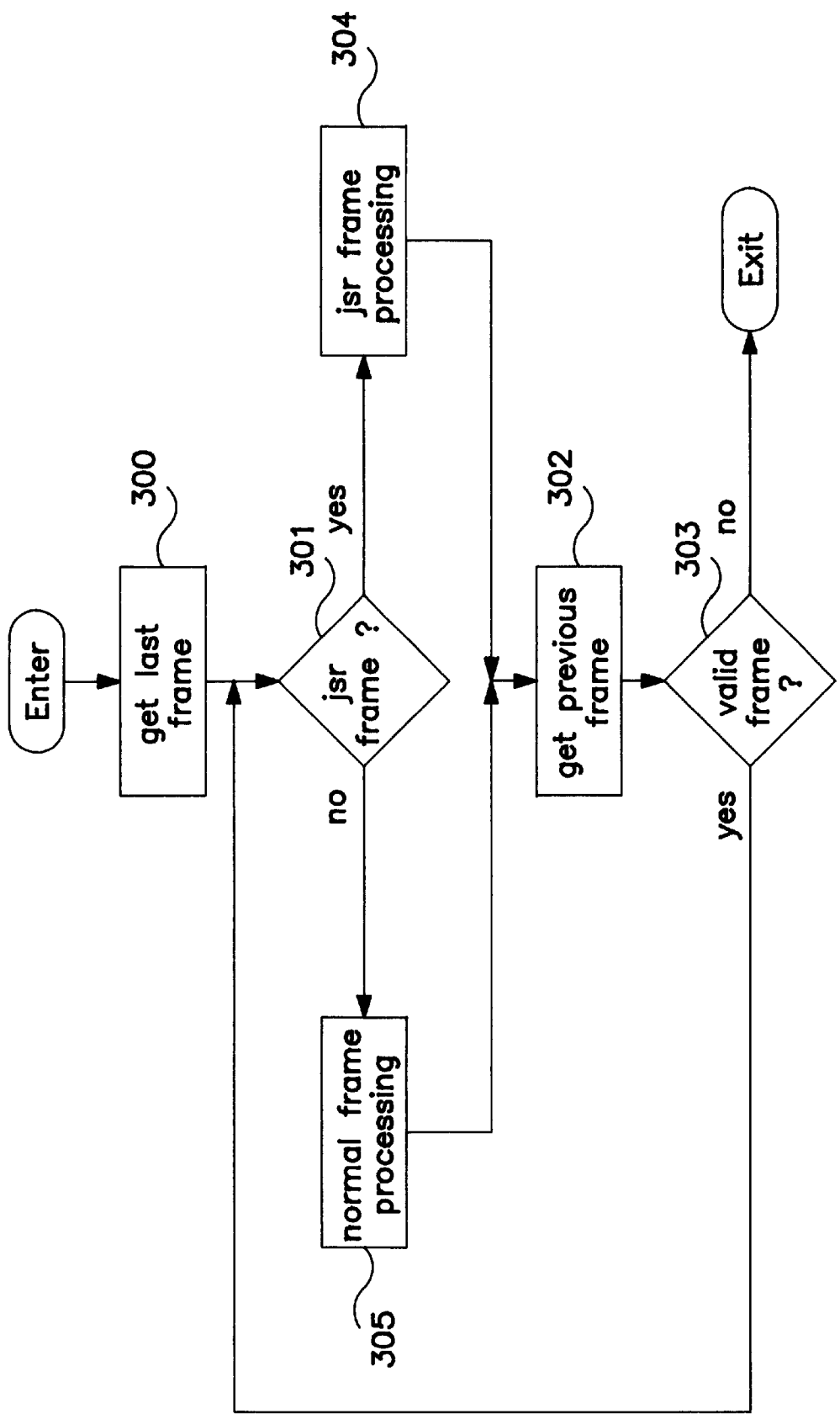
FIG. 3 is a flowchart diagram of an exemplary embodiment of the invention, illustrating an overview of a garbage collection stack walking procedure.

FIG. 3 is a flow chart of how the stack walking proceeds. Starting at the last frame, the stack walking proceeds up the stack, processing each frame as it is encountered. If a frame indicates the method was not in a JSR-subroutine when control was transferred, then normal frame processing occurs, i.e., the frame is scanned and its roots reported to the garbage collector. The method of the invention is executed to process frames where control was transferred while in a JSR-subroutine. The processing of non JSR-subroutine frames is not discussed.

The last frame is obtained at step 300. Detecting whether the frame was in a JSR-subroutine when control was transferred to the next method is done at step 301 as follows:

1. Determine the offset of the method call instruction in the calling code object by using the following steps:

Fetch the return address in the calling code object to which control will return when the method terminates. In an exemplary embodiment, the return address and a method id identifying the method are part of the method calling convention, and their location in the stack frame is thus known.

The method id is used to locate the origin of the calling code object, and the return address minus the code origin gives the offset of the method call instruction in the calling code object.

2. Determine the map for the offset determined in step 1 as follows:

Search the MCSites array 100 using the offset to find the entry that corresponds to the offset determined in step 1. The MCSites array 100 is an array of offsets where each entry corresponds to a given garbage collection or debugging site. The index of the corresponding entry number in the array becomes the mapid for the given site.

Examine the most significant bit in the referenceMaps entry for this given site, using the mapid as an index, to see if the given site is within a JSR-subroutine.

If the site is not in a JSR-subroutine, the remainder of the entry in the referenceMaps array 101 is the reference map for the given site.

If the site is within a JSR-subroutine, then the referenceMaps entry contains an index into the unusualMaps array 102. This index is referenced below as the unusualMapid.

If the frame was not in a JSR-subroutine, then the frame is processed normally (step 305). Otherwise, JSR frame processing is performed (step 304) as described below. After the frame has been processed, the previous frame (if any) is obtained (step 302), checked for validity (step 303), and conditionally evaluated (step 301) as appropriate.

IV. JSR-subroutine Frame processing

Figure 4:
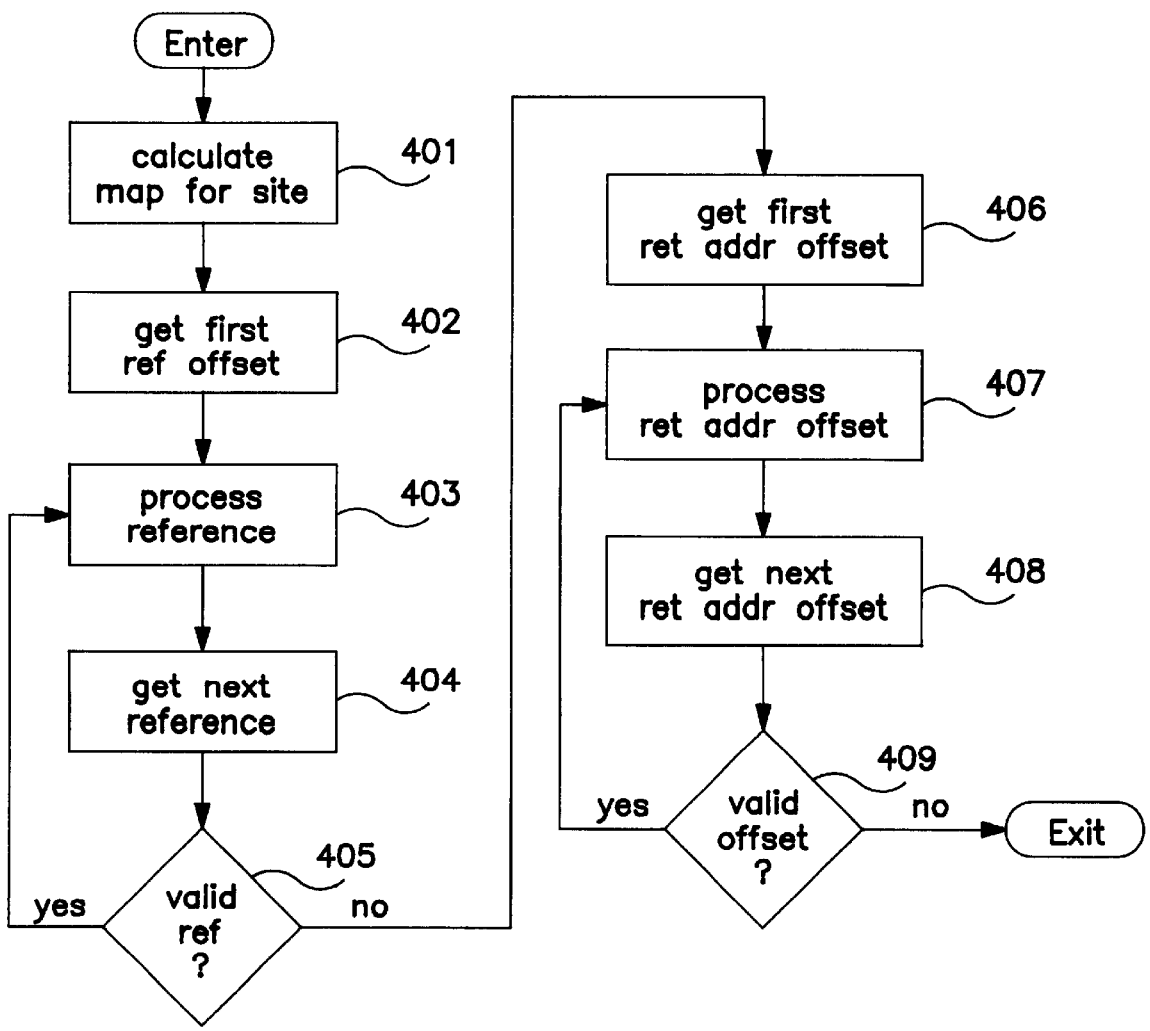
FIG. 4 is a flowchart diagram of the processing performed on frames which are determined to correspond to JSR-subroutines.
Figure 5:
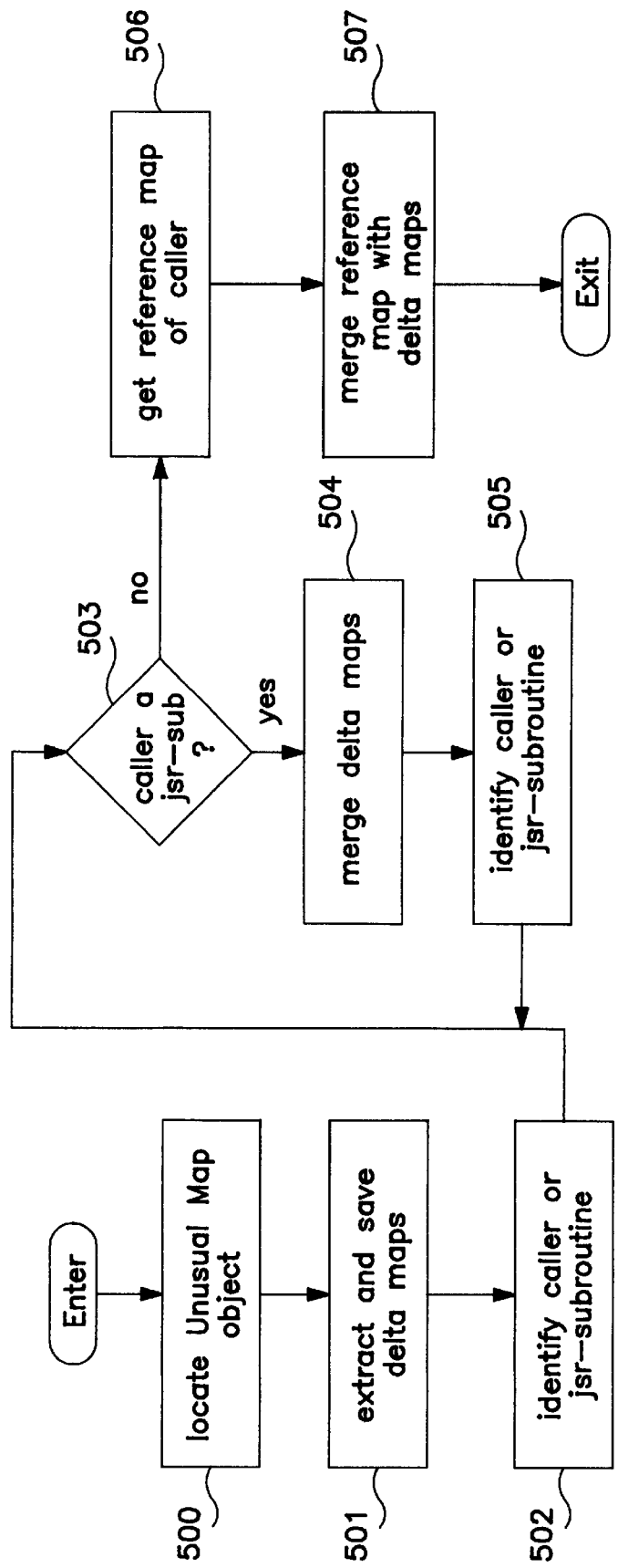
FIG. 5 is a flowchart diagram of the processing performed to generate maps for JSR-subroutines.

FIGS. 4 and 5 detail the operations in JSR-subroutine frame processing (step 304). Given the unusualMapid as described in section III-2 above, processing occurs as follows:

1. At step 401, the JSR-subroutine map for the site is determined. This is accomplished as shown in FIG. 5.

a. Using the unusualMapid as an index, locate the UnusualMap Object in the unusualMaps array (step 500). Each UnusualMap object contains all the information about a potential garbage collection or debugging site within a JSR-subroutine.

b. The "delta" maps associated with the sites are extracted and saved where they can be merged with other delta maps should this be a nested JSR situation (step 501).

c. Identify the caller of this JSR-subroutine (step 502). To do this we obtain the return-address-offset for the JSR-subroutine. This information is contained in the unusualMap object. Using this return-address-offset, get the JSR-subroutine return address, i.e. the address of the calling JSR instruction. Using the starting address of the code object, calculate the offset of the caller of the JSR-subroutine.

d. Identify the state at the JSR instruction site (step 503), i.e. is the caller itself within a JSR-subroutine (nested JSR-subroutines) or not. This is done by searching the MCSites array using the callers offset (similar to step III-2 above) and by examining the corresponding map.

e. If the calling JSR site is within another JSR-subroutine, this situation is a "nested" JSR-subroutine call. In this case, use the UnusualMap object containing information about the second, or "calling," JSR-subroutine to get its maps (step 504), as done in steps a. and b. above. The delta maps from this "calling" JSR-subroutine are merged with the previously saved delta maps. Note that the first JSR-subroutine encountered is the last JSR-subroutine to apply updates to the local variables. Accordingly, its updates to the local variables take precedence so that when the delta maps are merged, any changes made by the last JSR-subroutine are reflected in the merged map. For example, if a "calling" subroutine invokes a "called" subroutine, and both subroutines have changed the type of a given local variable, the changes made by the "called" subroutine are given priority and are reflected in the merged delta map. After this merger, the method goes to step c. above (step 505) and recurses until it gets into step f. below.

To get to step f, the method must work its way up, unnesting the JSR calls, and merging the delta maps corresponding to each JSR-subroutine call, until it reaches a JSR call from a non-JSR-subroutine. When the method finds such a call, it proceeds to step f below.

f. If the calling JSR site is NOT itself within a JSR-subroutine, get the map at that site and merge it with information in the saved delta map(steps 506, 507). The reference map lists, for each local variable, whether that local variable had been set to a reference at the time the JSR instruction at the JSR calling site was executed. In this merger, the changes recorded in the delta map are given priority, so that any changes made in "called" JSR-subroutines are reflected in the new, merged map. This new map is used to determine the state of the local variables for the garbage collection. In the context of debugging, the reference map would indicate which data types were stored in each local variable in the non JSR-subroutine, and the final merged map would reflect the type of data stored in each local variable at the time the debugging session is initiated.

2. Returning again to FIG. 4, the first reference in the frame is obtained (step 402). This is done by scanning the combined map for the first bit that is set to "1." The word corresponding to that bit is located and its offset from the frame pointer is determined. The correspondence is bit 1 represents word 1, bit 2 represents word 2 and so on. Each word whose corresponding bit is set is a reference (in other words, a pointer into the heap), and represents a "live" pointer whose integrity must be maintained through the garbage collection. The words begin at a known offset from the frame pointer. This offset of each reference is returned to the garbage collector for processing (step 403).

3. When the garbage collector requests the next reference (step 404), the method continues to scan forward from the previously located set bit until the next set bit is located. If no more references exist, as indicated by set bits, the method returns an indication of this situation (step 405).

4. The garbage collector then follows a similar procedure to determine the return addresses for all of the JSR-subroutine return addresses that are in the frame (steps 406–409) These return addresses are internal pointers to code objects and must be relocated if we are using a copying garbage collector that is moving code objects. A non-copying garbage collector does not need to relocate these pointers.

FIGS. 6(*a*)–6(*c*) are exemplary maps which are useful for illustrating the merging operation. FIG. 6(*a*) is an example of a base map. The 1s and 0s situated in the base map indicate whether corresponding variables are of a pointer type. An exemplary delta map is shown in FIG. 6(*b*). As previously discussed, the delta map includes a set-to-ref array and a set-to-non-ref array. Thus, if from the time of entering a JSR-subroutine to reaching the point-of-interest, a variable changes to a pointer type, the corresponding location in the set-to-ref array may be set to, for example, a 1. Similarly, if from the time of entering the JSR-subroutine to reaching the point-of-interest, a variable is changed so that it is no longer a pointer type, the corresponding portion of the set-to-non-ref array may be set to, for example, a 1. For any variable, if the delta map does not indicate any changes, then the variable type which appears in the base map also appears in the merged map. Regardless of the variable type in the base map, if the set-to-ref array indicates that the variable type of a variable has been changed to a pointer, then the type of that variable in the merged map is also indicated as being a pointer. Regardless of whether the base map indicates that a variable is a pointer, if the set-to-non-ref array indicates that the type of the variable has been changed so that it is not a pointer, then the merged map also indicates that the variable type for that variable is not a pointer.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of tracking types of local variables in a computer program having a plurality of subroutines which are executed following respective subroutine invocation, said method comprising the steps of:
   a) for each subroutine invocation outside of said plurality of subroutines, generate respective base maps indicating types of respective ones of said local variables;
   b) for any points-of-interest within any of said plurality of subroutines, generate respective delta maps indicating changes to said respective ones of said local variables;
   c) determining execution paths towards each of said points-of-interest to identify which of said base maps corresponds to respective subroutine invocation; and
   d) merging a) each of said base maps with b) a respective current delta map each of which is obtained from a respective one of said delta maps based on said execution paths to determine types of said local variables.

2. A method of tracking types of local variables according to claim 1, wherein respective return addresses are saved at the times of respective subroutine invocation, said return addresses being used in step c) to determine said execution paths.

3. A method of tracking types of local variables according to claim 2, further comprising the step of performing garbage collection based on the results of step d).

4. A method of tracking types of local variables according to claim 1, wherein each of said subroutines are invoked from respective further subroutines, further delta maps indicating changes to ones of said local variables are generated for each of said further subroutines, respectively, said further delta maps each combined with a respective one of said delta maps to obtain said current maps.

5. A method of tracking types of local variables according to claim 4, wherein at least one of said variables is determined to be a pointer, wherein during garbage collection said pointer and an object pointed to by said pointer are preserved while other memory locations are deallocated.

6. A method of tracking types of local variables according to claim 1, further comprising the step of performing garbage collection based on the results of step d).

7. A method of tracking types of local variables in a computer program having a subroutine which is executed following a subroutine invocation, said method comprising the steps of:
   a) for said subroutine invocation outside of said subroutine, generating a base map indicating types of said local variables;
   b) for a point-of-interest within said subroutine, generating a delta map indicating changes to any of said local variables;
   c) determining an execution path towards said point-of-interest to identify said base map as corresponding to said subroutine invocation; and
   d) merging a) said base map with b) a current delta map which is obtained from said delta map in accordance with said execution path to determine types of said local variables.

8. A method of tracking types of local variables according to claim 7, wherein said subroutine is invoked from a further subroutine, a further delta map indicating changes to any of said local variables is generated for said further subroutine, and said further delta map is combined with said delta map to obtain said current map.

9. A method of tracking types of local variables according to claim 7, further comprising the step of performing garbage collection based on the results of step d).

10. A method of tracking types of local variables according to claim 8, further comprising the step of performing garbage collection based on the results of step d).

11. A method of tracking types of local variables according to claim 9, wherein at least one of said variables is determined to be a pointer, wherein during garbage collection said pointer and an object pointed to by said pointer are preserved while other memory locations are deallocated.

12. A method of tracking types of local variables according to claim 7, further comprising the step viewing ones of said local variables to perform debugging of said computer program.

13. A method of tracking types of local variables according to claim 7, wherein said computer program comprises Java™ Virtual Machine instructions.

14. A method of tracking types of local variables according to claim 7, wherein each of said base map, said delta map, and said current map indicates whether said local variable is one of a pointer and a primitive.

15. A method of tracking types of local variables according to claim 7, wherein said base map is generated using static data flow analysis.

16. A method of tracking types of local variables according to claim 7, wherein a return address is saved at the time of subroutine invocation, said return address being used in step c) to determine said execution path.

17. A method of tracking types of local variables according to claim 7, wherein each of said base map and said delta map are registered with a map locator, and wherein said map locator is queried to identify said delta map as being used for merging in step d).

18. A method of tracking types of local variables according to claim 7, wherein when said current map is formed, said merging is performed giving precedence to said delta map over said further delta map.

19. A method of tracking types of local variables according to claim 7, wherein in step d), said merging is performed giving precedence to said current delta map over said base map.

20. Apparatus for tracking types of local variables in a computer program having a subroutine which is executed following a subroutine invocation, said apparatus comprising:
   base map generation means for generating a base map indicating types of said local variables for said subroutine invocation outside of said subroutine;
   delta map generation means for generating a delta map indicating changes to any of said local variables for a point-of-interest within said subroutine;
   determining means for determining an execution path towards said point-of-interest to identify said base map as corresponding to said subroutine invocation; and
   merging means for merging said base map with a current delta map which is obtained from said delta map in accordance with said execution path to determine types of said local variables.

21. Apparatus for tracking types of local variables according to claim 20, wherein a return address is saved at the time of subroutine invocation, said return address being used by said determining means for determining said execution path.

22. Apparatus for tracking types of local variables according to claim 20, wherein said subroutine is invoked from a further subroutine, and said delta map generation means is further for generating a further delta map indicating changes to said local variables for said further subroutine, wherein said merging means is further for combining said further delta map with said delta map to obtain said current map.

23. An article of manufacture comprising a computer useable medium having computer readable program code means embodied therein for tracking types of local variables in a computer program having a subroutine which is executed following a subroutine invocation, the computer readable program code means in said article of manufacture comprising computer readable program code means for causing a computer to effect:
   for said subroutine invocation outside of said subroutine, generating a base map indicating types of said local variables;
   for a point-of-interest within said subroutine, generating a delta map indicating changes to any of said local variables;
   determining an execution path towards said point-of-interest to identify said base map as corresponding to said subroutine invocation; and
   merging a) said base map with b) a current delta map which is obtained from said delta map in accordance with said execution path to determine types of said local variables.

24. An article of manufacture as recited in claim 23, wherein said subroutine is invoked from a further subroutine, the computer readable program code means in said article of manufacture further comprising computer readable program code means for causing a computer to effect:
   generating for said further subroutine a further delta map indicating changes to any of said local variables, wherein said further delta map is merged with said delta map to obtain said current map.

25. An article of manufacture as recited in claim 23, wherein a return address is saved at the time of subroutine invocation, and wherein said return address is used to determine said execution path.

26. A computer program product comprising a computer useable medium having computer readable program code means embodied therein for causing local variables to be tracked in a computer program having a subroutine which is executed following a subroutine invocation, said computer readable program code means in said computer program product comprising computer readable program code means for causing a computer to effect:
   for said subroutine invocation outside of said subroutine, generating a base map indicating types of said local variables;
   for a point-of-interest within said subroutine, generating a delta map indicating changes to any of said local variables;
   determining an execution path towards said point-of-interest to identify said base map as corresponding to said subroutine invocation; and
   merging a) said base map with b) a current delta map which is obtained from said delta map in accordance with said execution path to determine types of said local variables.

27. A computer program product as recited in claim 26, wherein a return address is saved at the time of subroutine invocation, said return address being used to determine said execution path.

28. A computer program product as recited in claim 26, wherein said subroutine is invoked from a further subroutine, a further delta map indicating changes to said local variables is generated for said further subroutine, and wherein said further delta map is combined with said delta map to obtain said current map.

29. An article of manufacture comprising a computer usable medium having computer readable program code means embodied therein for causing a method of tracking types of local variables in a computer program having a plurality of subroutines which are executed following respective subroutine invocation, said method comprising the steps of:
   a) for each subroutine invocation outside of said plurality of subroutines, generating respective base maps indicating types of respective ones of said local variables;
   b) for any points-of-interest within any of said plurality of subroutines, generating respective delta maps indicating changes to said respective ones of said local variables;
   c) determining execution paths towards each of said points-of-interest to identify which of said base maps corresponds to respective subroutine invocation; and
   d) merging a) each of said base maps with b) a respective current delta map each of which is obtained from a respective one of said delta maps based on said execution paths to determine types of said local variables.

30. An article of manufacture comprising a computer usable medium having computer readable program code means embodied therein for causing a method of tracking types of local variables in a computer program having a subroutine which is executed following a subroutine invocation, said method comprising the steps of:
- a) for said subroutine invocation outside of said subroutine, generating a base map indicating types of said local variables;
- b) for a point-of-interest within said subroutine, generating a delta map indicating changes to any of said local variables;
- c) determining an execution path towards said point-of-interest to identify said base map as corresponding to said subroutine invocation; and
- d) merging a) said base map with b) a current delta map which is obtained from said delta map in accordance with said execution path to determine types of said local variables.

31. A program storage device readable by machine, tangibly embodying a program of instructions executable by the machine to perform methods of tracking types of local variables in a computer program having a plurality of subroutines which are executed following respective subroutine invocation, said method comprising the steps of:
- a) for each subroutine invocation outside of said plurality of subroutines, generating respective base maps indicating types of respective ones of said local variables;
- b) for any points-of-interest within any of said plurality of subroutines, generating respective delta maps indicating changes to said respective ones of said local variables;
- c) determining execution paths towards each of said points-of-interest to identify which of said base maps corresponds to respective subroutine invocation; and
- d) merging a) each of said base maps with b) a respective current delta map each of which is obtained from a respective one of said delta maps based on said execution paths to determine types of said local variables.

32. A program storage device readable by machine, tangibly embodying a program of instructions executable by the machine to perform methods of tracking types of local variables in a computer program having a subroutine which is executed following a subroutine invocation, said method comprising the steps of:
- a) for said subroutine invocation outside of said subroutine, generating a base map indicating types of said local variables;
- b) for a point-of-interest within said subroutine, generating a delta map indicating changes to any of said local variables;
- c) determining an execution path towards said point-of-interest to identify said base map as corresponding to said subroutine invocation; and
- d) merging a) said base map with b) a current delta map which is obtained from said delta map in accordance with said execution path to determine types of said local variables.

* * * * *

UNITED STATES PATENT AND TRADEMARK OFFICE
CERTIFICATE OF CORRECTION

PATENT NO. : 6,442,751 B1
DATED : July 23, 2002
INVENTOR(S) : Richard Aufrichtig et al.

Page 1 of 1

It is certified that error appears in the above-identified patent and that said Letters Patent is hereby corrected as shown below:

Column 6,
Line 13, insert -- of -- after "efficiency".

Column 8,
Lines 45 and 47, delete "-" between the words "circuit,-and"

Column 9,
Line 32, insert -- of -- after "efficiency".

Column 10,
Line 29, insert -- of -- after "efficiency".

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,442,751 B1
DATED         : August 27, 2002
INVENTOR(S)   : Anthony Cocchi It is certified that error appears in the above-identified patent and that said Letters Patent is hereby corrected as shown below:

This certificate supersedes Certificate of Correction issued February 4, 2003, the number was erroneously mentioned and should be vacated since no Certificate of Correction was granted.

Signed and Sealed this

Second Day of September, 2003

JAMES E. ROGAN
*Director of the United States Patent and Trademark Office*